United States Patent
Alig et al.

(10) Patent No.: US 10,189,673 B2
(45) Date of Patent: Jan. 29, 2019

(54) METHOD AND APPARATUS FOR APPLYING LIQUID NUTRIENTS BETWEEN PARALLEL ROWS OF STANDING CROPS

(71) Applicant: Alig Environmental Solutions, LLC, Ft. Recovery, OH (US)

(72) Inventors: David Dale Alig, Ft. Recovery, OH (US); Gregory K. Alig, Celina, OH (US); Rick E. Alig, Ft. Recovery, OH (US)

(73) Assignee: Alig Enviromental Solutions, LLC, Fort Recovery, OH (US)

( * ) Notice: Subject to any disclaimer, the term of this patent is extended or adjusted under 35 U.S.C. 154(b) by 692 days.

(21) Appl. No.: 14/296,679

(22) Filed: Jun. 5, 2014

(65) Prior Publication Data
US 2014/0361093 A1    Dec. 11, 2014

Related U.S. Application Data

(60) Provisional application No. 61/956,391, filed on Jun. 7, 2013.

(51) Int. Cl.
| | |
|---|---|
| *B65H 75/42* | (2006.01) |
| *B65H 75/44* | (2006.01) |
| *A01C 23/00* | (2006.01) |
| *A01C 23/02* | (2006.01) |

(52) U.S. Cl.
CPC ......... *B65H 75/425* (2013.01); *A01C 23/001* (2013.01); *A01C 23/021* (2013.01); *B65H 75/4402* (2013.01); *B65H 75/4413* (2013.01); *B65H 75/4489* (2013.01); *B65H 2701/33* (2013.01)

(58) Field of Classification Search
CPC ........ B05B 9/007; A01G 25/00; A01G 23/00; A01G 17/00; A01G 25/095; A01G 25/097
USPC ......................................................... 239/734
See application file for complete search history.

(56) References Cited

U.S. PATENT DOCUMENTS

| | | | | |
|---|---|---|---|---|
| 3,753,409 A | * | 8/1973 | Frazier ................. | A01C 23/025 111/123 |
| 4,637,547 A | * | 1/1987 | Hiniker .................. | B05B 12/00 239/1 |
| 4,756,260 A | * | 7/1988 | Petersen .............. | A01C 23/021 111/123 |
| 5,907,925 A | | 6/1999 | Guyot | |

(Continued)

*Primary Examiner* — Steven J Ganey
*Assistant Examiner* — Joel Zhou
(74) *Attorney, Agent, or Firm* — Jacox, Meckstroth & Jenkins

(57) ABSTRACT

Liquid nutrients are continuously applied to rows of standing crops by pulling a drag hose from a reel located at one end of a field and between two crop rows with a boom having a forward end pivotally connected to an applicator mounted on a tractor and a rearward end supported by a wheel. The boom carries a supply line having a rearward end connected to the drag hose and a forward end connector to the applicator having the same length as the boom. At the opposite end of the field, the tractor and applicator turn 180° while the boom passes over the applicator. The tractor returns down a second plurality of rows back to the first end of the field while the reel simultaneously retracts the hose between the two rows of crops. The reel is moved to a third plurality of rows the steps are repeated.

7 Claims, 5 Drawing Sheets

(56) References Cited

U.S. PATENT DOCUMENTS

| | | | |
|---|---|---|---|
| 6,179,216 B1 * | 1/2001 | Panhelleux | A01G 25/095 239/1 |
| 6,427,612 B1 | 8/2002 | Huffman | |
| 7,063,276 B2 | 6/2006 | Newton | |
| 7,509,977 B2 | 3/2009 | Huffman | |
| 7,744,012 B2 | 6/2010 | Manders et al. | |
| 8,256,692 B2 | 9/2012 | Knowles | |
| 2013/0299601 A1 * | 11/2013 | Ballu | A01M 7/0057 239/1 |

* cited by examiner

METHOD AND APPARATUS FOR APPLYING LIQUID NUTRIENTS BETWEEN PARALLEL ROWS OF STANDING CROPS

RELATED APPLICATION

This application claims the benefit of Provisional Patent Application Ser. No. 61/956,391, filed Jun. 7, 2013.

BACKGROUND OF THE INVENTION

Various methods and equipment have been proposed and/or used for applying liquid nutrients, such as liquid manure, to large fields before crops are planted or soon after planting, and some of the equipment commonly uses an elongated flexible and hard drag hose which is wound onto a large spool or reel. The inlet of the drag hose receives the liquid manure from a line connected to a pump which receives the liquid from a supply source such as a pond or tank or a tank on a vehicle. The outlet of the hose is connected to a combined tool bar and applicator which is carried into the field by a vehicle such as a farm tractor. The reel with the wound hose may be carried by a trailer pulled by the tractor, for example, as disclosed in U.S. Pat. No. 5,907,925 and U.S. Pat. No. 7,744,012. It is also known to pull the hose from a supply reel located at an end or middle of the field and back and forth across the field by the tractor and applicator soon after a crop is planted, for example, as disclosed in U.S. Pat. No. 6,427,612 and U.S. Pat. No. 8,256,692, It has been determined that the best time for applying liquid manure or liquid nutrients to a field used for growing row crops is after the crops have begun to grow but before they go through the process of using the majority of nutrients they use, for example, after parallel rows of corn have grown over one or two feet. This keeps the nutrients within the liquid from reaching or flowing or leaking into adjacent streams, rivers or lakes. It is also highly desirable to apply the liquid nutrients efficiently without significantly compacting the soil which results when a large reel wound with a drag hose is on a trailer pulled into a field while the liquid is being pumped through the hose or as a result of pulling or transporting a large tank filled with liquid nutrients through the field with a tractor. For example, when a reel having an extended length of drag hose, for example, over 2,000 feet, is filled with the liquid, the combined weight of the reel, drag hose, liquid and trailer is substantial and significantly compacts the soil in the field and can damage the crops, including the end crop rows in the field when the equipment turns to apply the liquid to another group or plurality of crop rows.

SUMMARY OF THE INVENTION

The present invention is directed to an improved system or method and apparatus for applying liquid nutrients such as liquid manure between parallel rows of standing crops growing in a field and with minimal damage to the crops. In accordance with one embodiment of the invention, an elongated flexible and hard drag hose is wound onto a power driven hose reel with the hose having an inlet end and an outlet end and an inside diameter of several inches. The hose reel is supported by a trailer or vehicle for axial movement adjacent a first end of a field and in a direction perpendicular to the rows of crops extending the length of the field. The inner end of the drag hose wound on the reel receives the liquid nutrients pumped from a supply source, and the outer end of the drag hose extends from the hose reel to a rearward end portion of an elongated supply line supported by an elongated boom having a rearward portion supported by a caster wheel. A forward end portion of the boom is pivotally connected to a central portion of an elongated applicator which is carried by a tractor adapted to move between the crop rows with the applicator extending transversely or perpendicular to the rows.

The forward end portion of the supply line is connected to a liquid distribution line carried by the applicator and having outlets located between the crop rows. While the liquid nutrients are pumped into the inlet end of the drag hose supported by the hose reel, the drag hose is pulled with the tractor and boom from the hose reel between two adjacent rows of crops causing the hose reel to rotate on its axis perpendicular to the crop rows. The drag hose is maintained between the two adjacent rows of crops while being pulled from the reel with the tractor and boom. At the opposite end of the field, the tractor and applicator make a 180 degree turn while the boom and supply line are elevated to swing over the applicator. The tractor and applicator are positioned with the applicator perpendicular to another second plurality of crop rows.

As the tractor and applicator return to the first end of the field, the liquid nutrients are preferably supplied continuously through the drag hose, supply line and applicator distribution line to the second plurality of crop rows. The drag hose is maintained between the two adjacent crop rows with the boom and supply line extending laterally from the tractor and while the drag hose is wound back onto the hose reel. With the rewinding of the drag hose onto the hose reel, the rewinding is synchronized, preferably by a remote control from the tractor, with the return of the tractor and applicator to the first end of the field. The hose reel and rewound hose are then moved axially with the vehicle or trailer and in a direction perpendicular to the crop rows to a third plurality of crop rows where the tractor with the applicator are repositioned so that the above steps for applying the liquid nutrients may be repeated.

The boom has a length generally the same as the length of the applicator, and the rearward end portion of the boom, which carries the supply line, is supported by the caster wheel and may be normally elevated to clear the crops at the turn. The caster wheel may also be connected to a hydraulic cylinder controlled from the pulling tractor for elevating the rearward end portion of the boom and supply line. When the forward end portion of the boom is elevated with the applicator by the tractor at the opposite end of the field, the boom swings over the applicator while the tractor and applicator are making the U-turn at the opposite end of the field.

The hose reel may be moved axially during winding and unwinding of the drag hose in order to maintain the drag hose between the two adjacent rows of crops during a full round trip of the tractor and applicator. The hose reel may also be moved axially either with a hydraulic motor connected to a carriage supported by parallel tracks on the vehicle or by moving the vehicle linearly, for example by hydraulically driving the wheels on the vehicle. As the drag hose unwinds from the hose reel or is rewound on the hose reel, the position of the drag hose may be detected by a sensing system which controls the axial movement of the hose reel through a hydraulic valve which controls the linear movement of the carriage on the vehicle or the linear movement of the vehicle to produce axial movement of the hose reel according to the helical winding of the hose on the reel. The drag hose on the reel may also be guided by a set of rollers supported by a frame connected to the reel support and projecting from one side of the reel to direct and align the hose between the two rows of crops during unwinding and winding of the hose.

Other features and advantages of the invention be apparent from the following description, the accompanying drawings and the appended claims.

DESCRIPTION OF APPARATUS CONSTRUCTED AND USED IN ACCORDANCE WITH INVENTION

Figure 1:
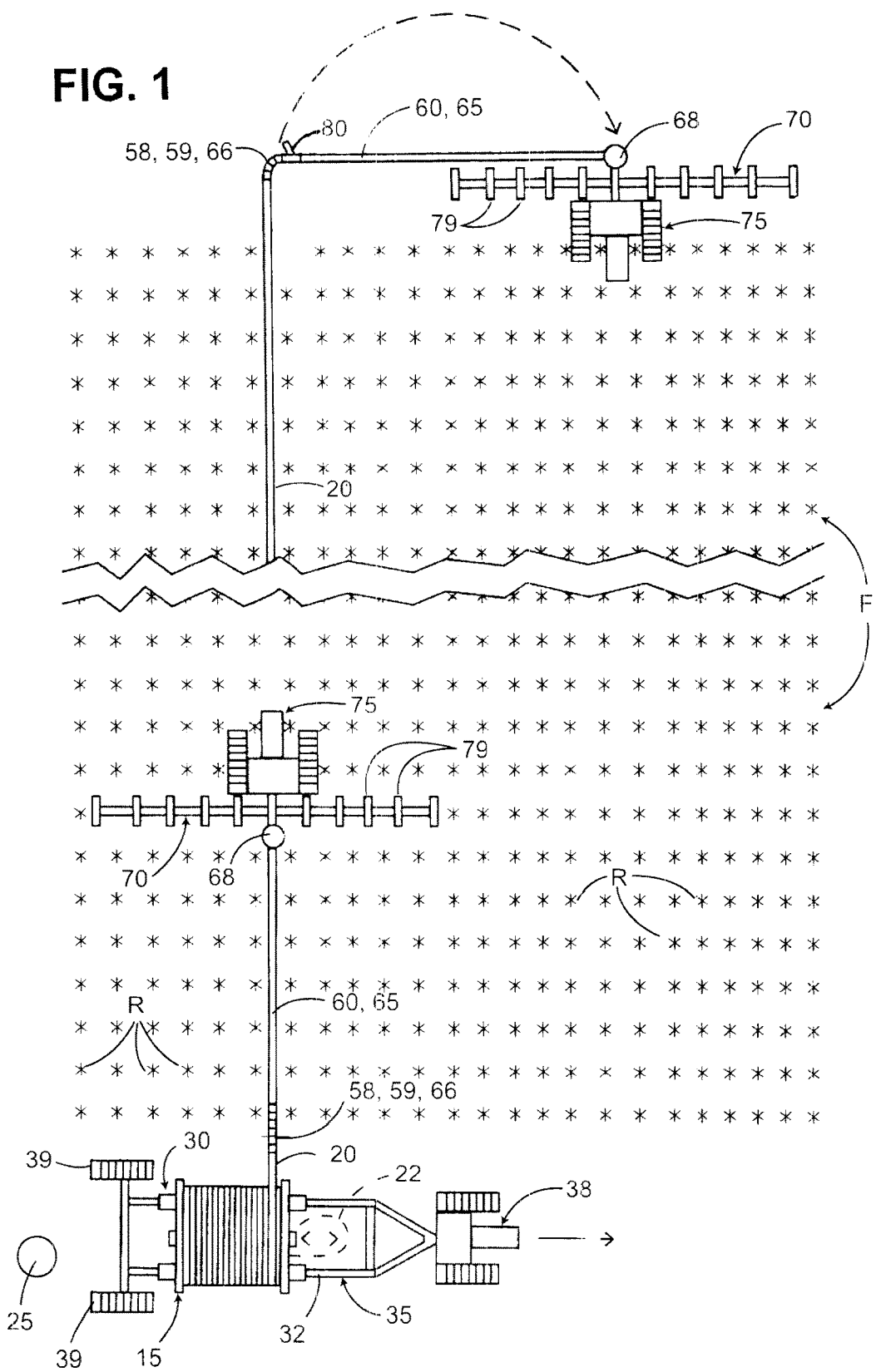
FIG. 1 is a diagrammatic plan view of a field with parallel rows of standing and growing crops and illustrating the general construction and use of equipment or apparatus in accordance with the invention for applying liquid nutrients between the rows of standing crops with a drag hose.

A large diameter spool or reel 15 is helically wound with multiple courses of an elongated flexible and hard drag hose 20 which has an inner inlet connected to a flexible supply line 22 extending from a supply source 25 of liquid nutrients which herein may be referred to as liquid. The reel 15 has a large diameter, for example, about fourteen feet, and an axial length of about twelve feet. The drag hose 20 has an inner diameter, for example, over four inches and preferably about five inches in diameter, and an extended length, for example, over 2,000 feet and preferably over 2500 feet. The reel 15 and wound drag hose 20 may be supported for axial movement, for example, a distance of fourteen feet by a carriage 30 which travels on parallel spaced rails 32 of a vehicle or trailer 35 pivotally connected by a hitch to a tow tractor 38.

Figure 7:
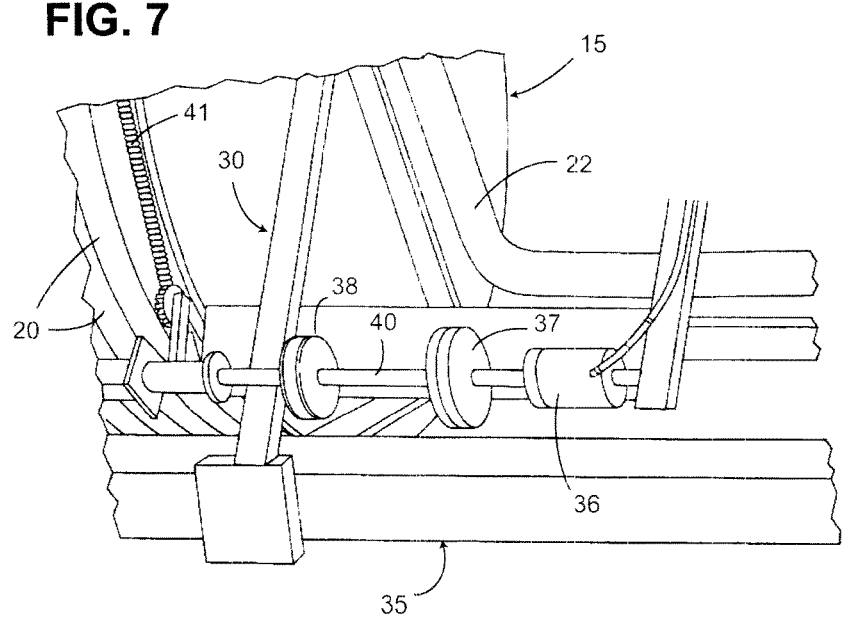
FIG. 7 is a diagrammatic perspective view of the drive for the hose reel.

Axial movement of the reel 15 and linear movement of the carriage 30 may be produced by a reversible hydraulic motor (not shown) which drives a chain extending under the reel 15 within the trailer and having opposite end portions connected to opposite ends of the carriage 30. The chain may be driven by the reversible hydraulic motor, and another reversible hydraulic motor 36 (FIG. 7) may be carried by the vehicle 35 and is connected to rotate the reel 15 through a horizontal drive shaft 40 connected by chains 41 which extend around opposite end portions of the reel 15 and around corresponding sprockets on the drive shaft. A hydraulic actuated clutch 37 and brake 38 may be used to connect the reversible hydraulic motor 36 to the drive shaft for precisely controlling the reversible rotation of the reel 15 on the carriage 30 or vehicle 35.

Figure 3:
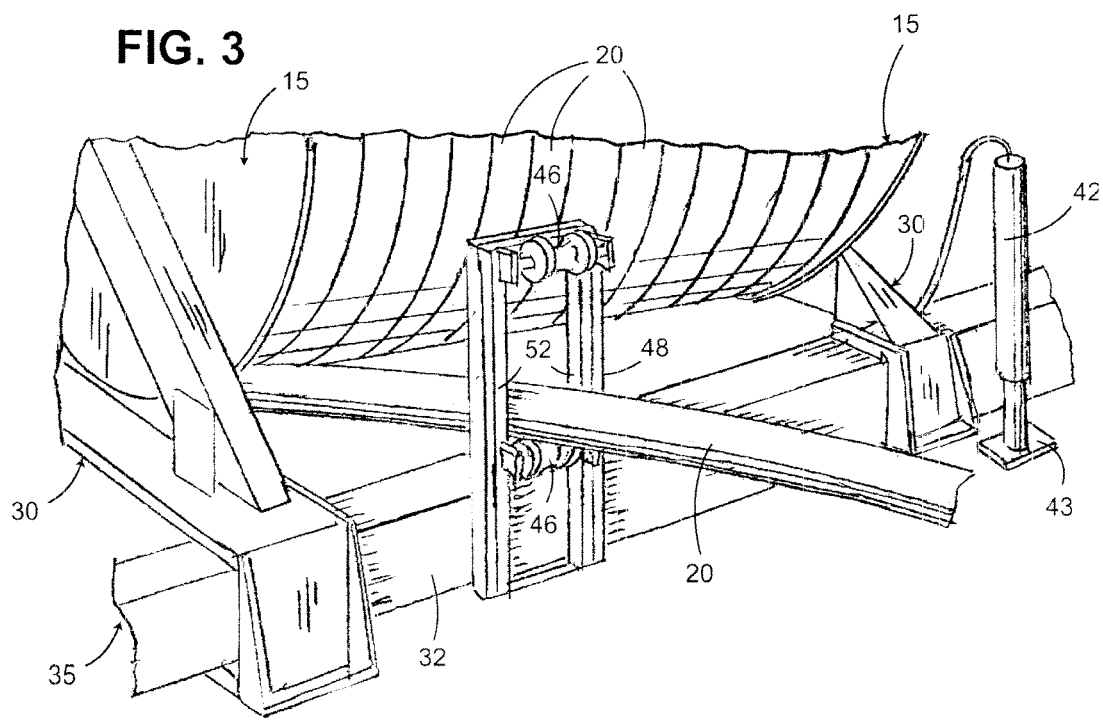
FIG. 3 is a fragmentary perspective view of a vehicle frame supporting a hose reel for rotation on its axis and for axial movement of the hose reel and drag hose with the vehicle.

It is also within the scope of the invention to move the reel 15 axially by supporting the reel 15 for rotation only on the vehicle 35 and driving each of the wheels 39 supporting the vehicle 35 with a reversible and controllable hydraulic motor. All of the hydraulic motors on the vehicle 35 are supplied with pressurized hydraulic fluid from a reservoir and engine driven pump on the vehicle or from the tow tractor 38, and the motors may be remotely controllable. As shown in FIG. 3, opposite end portions of the vehicle 35 may have hydraulically actuated cylinders 42 with downwardly projecting piston rods supporting retractable stabilizing pads 43 for engaging the ground when the drag hose 20 is being pulled and unwound from the reel 15 to prevent tilting of the vehicle 35. Either cylinder 42 may be inclined or vertical.

Figure 8:
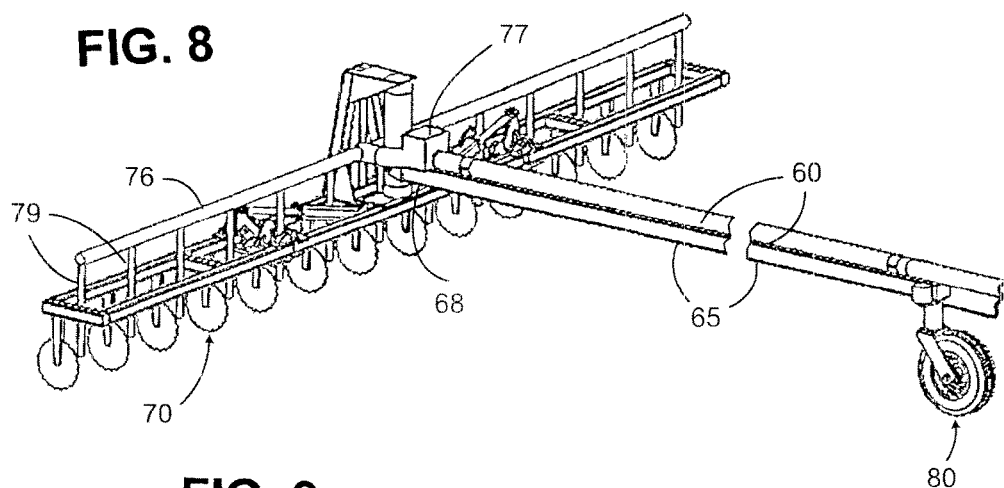
FIG. 8 is a perspective view of an applicator pivotally connected to the boom and supply line.

As also shown in FIG. 3, when the drag hose 20 is pulled from the reel 15 or is helically rewound on the reel by the hydraulic motor 36 which rotates the reel, the drag hose 20 may pass between a pair of vertically spaced guide rollers 46 supported by a frame 48 supported for tilting movement on a vertical axis relative to the carriage 30. A pair of opposing vertical rollers or plastic guide strips 52 are also supported by the frame 48, and a control rod may be connected to the frame 48 to sense tilting movement of the frame on the vertical axis as the drag hose 20 is unwound or rewound on the reel 15. The control rod may be connected to a hydraulic valve (not shown) which controls the hydraulic motor connected to move the carriage 30 on the trailer or vehicle 35 horizontally back and forth to obtain uniform helically winding of the drag hose 20 on the reel 15. The hydraulic valve may also be used to move the vehicle 35 back and forth by controlling the hydraulic motors which drive the wheels 39 of the vehicle The opposite outlet end of the drag hose 20 is connected by a flexible line or hose coupling 58 (FIG. 4) to a rearward end portion 59 of an elongated tubular supply line 60 supported on top and carried by an elongated fabricated steel boom 65. The boom 65 has a pivotal rearward end portion 66 which supports the end portion 59 of the supply line 60, and the end portion 66 is pivoted by a hydraulic cylinder 62. Another flexible line or coupling 58 connects the supply line 60 to the end portion 59 of supply line 60. Both the supply line 60 and the boom 65 may have substantial length, for example, on the order of 40 feet, but the boom 65 may be telescopic, and the supply line 60 may be foldable. The forward end portion of the boom 65 is pivotally connected by a universal coupling 68 to a laterally extending elongated tool bar and liquid applicator 70 which is carried by and supported for vertical movement by a tractor 75 (FIG. 1). The applicator 70 has a liquid distribution line 76 (FIG. 8) connected to the forward end portion of the liquid supply line 60 by a liquid distributor 77 of the general type, for example, as disclosed in U.S. Pat. Nos. 6,427,612, 7,063,276 or 7,509,977. The liquid distribution line 76 carried by the applicator 70 supplies the liquid to outlets or nozzles 79 (FIG. 8) located between crop rows R and directed to the ground surface or slightly below the ground surface. Different forms of crop row applicators are disclosed, for example, in U.S. Pat. Nos. 6,701,856 and 7,077,070.

Figure 2:
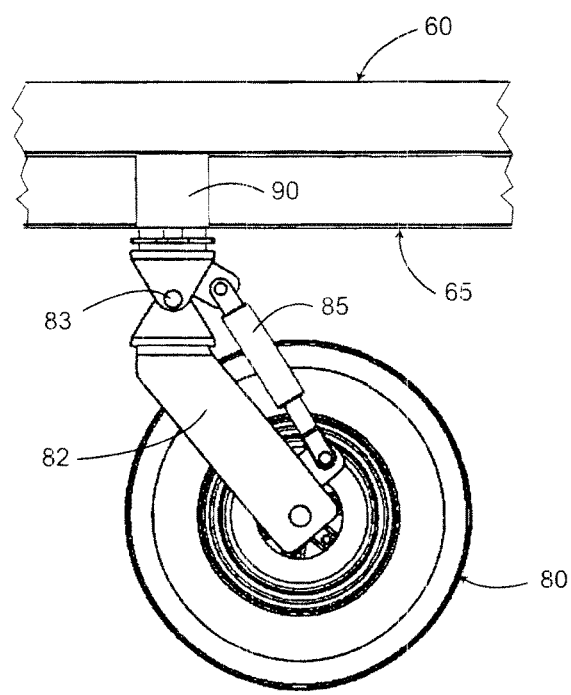
FIG. 2 is a side view of a vertically movable caster wheel for supporting a boom which carries a liquid nutrient supply line connected to an applicator attached to a tractor, as shown in FIG. 1.
Figure 4:
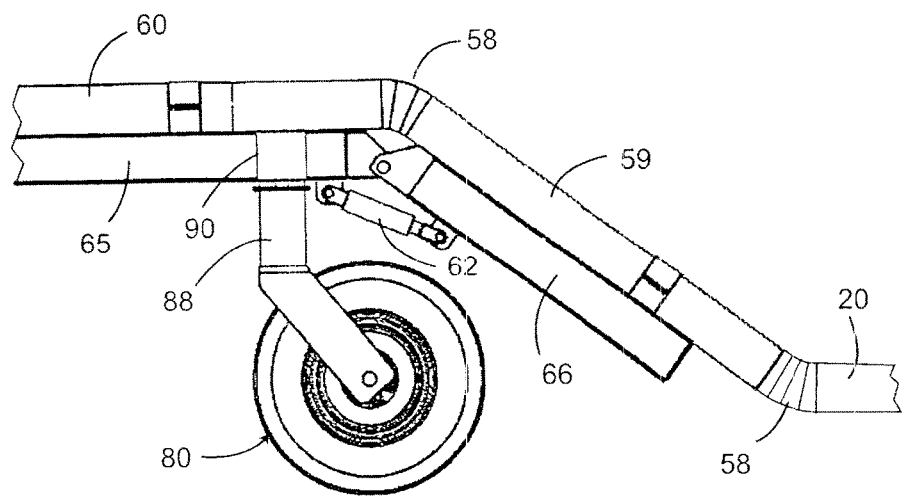
FIG. 4 is an elevational view of a rearward portion of an elevated boom supported by caster wheel and with a pivotable end portion of the boom supporting a flexible rearward portion of the supply line connected to the drag hose.
Figure 5:
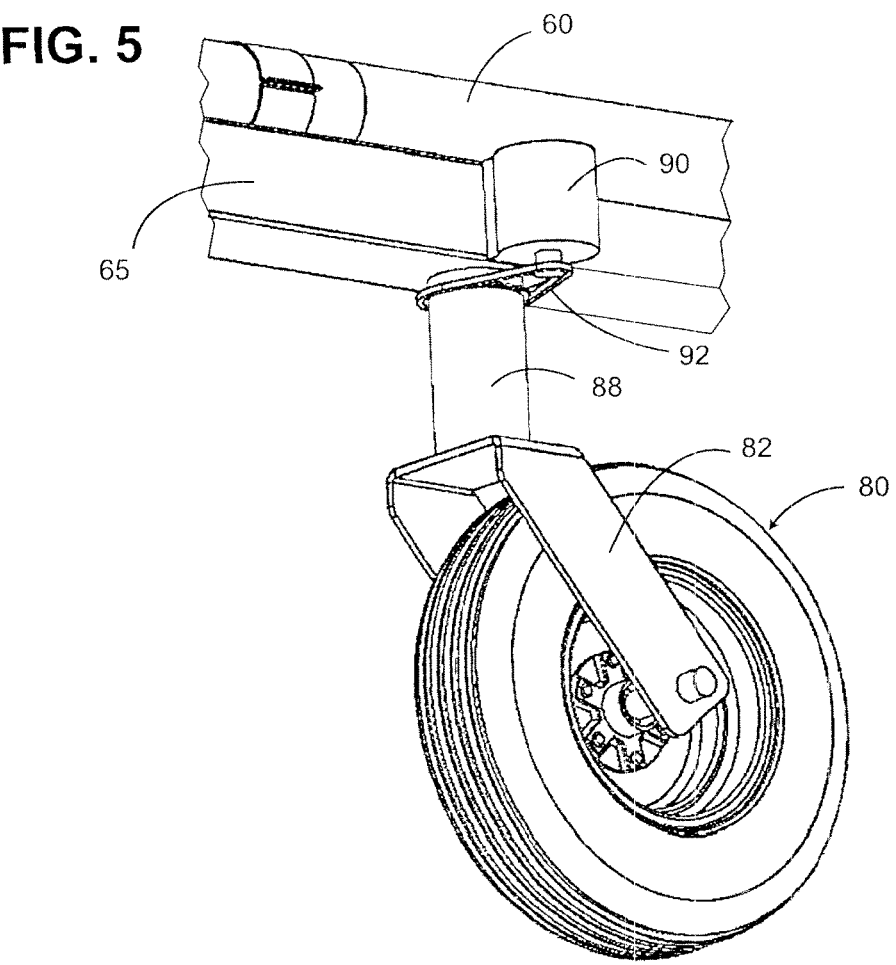
FIG. 5 is a fragmentary view of the rearward portion of the boom and supply line shown in FIG. 4 and also showing a motor drive for rotating the caster wheel.
Figure 6:
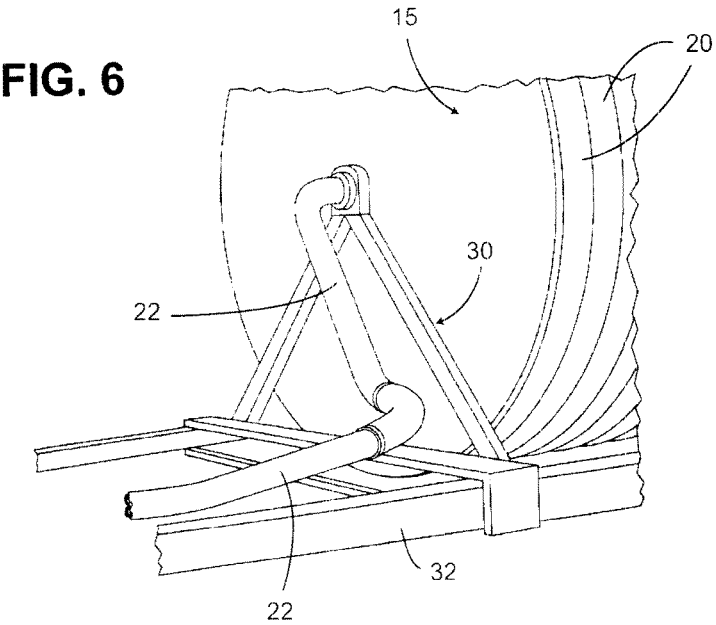
FIG. 6 is a fragmentary perspective view of the inlet end of the hose reel for supplying liquid nutrients to the drag hose.

Referring to FIG. 2, a rearward portion of the boom 65 may be supported by a wheel such as a caster wheel 80 which rotates on a vertical axis and may be controlled for rotation by the operator of the tractor 75. The wheel 80 is supported by arms 82 pivotal on a horizontal axis by a pin 83. The rearward portion of the boom 65 may be elevated by actuation of a hydraulic cylinder 85 connected to the arms 82 and controlled from the tractor 75. As shown in FIGS. 4 & 5, the caster wheel 80 may be supported for pivoting only on a vertical axis and be supported by a vertical tubular shaft 88 which is rotated by a hydraulic motor 90 connected to the shaft 88 by a chain drive 92 (FIG. 5). The motor 90 may also be controlled from the tractor 75.

The equipment or apparatus described above is used for applying liquid manure or liquid nutrients between parallel rows R of standing crops, such as rows of growing corn having spacing of thirty inches between rows and a height of two or three feet. The drag hose reel 15 is supported by the vehicle 35 and is located at one end of a field F which may have substantial length, for example, one-half mile. The tractor 75 and boom 65, with the pivotal end portion 66, pull the drag hose 20 from the reel 15 while the liquid is being pumped through the drag hose 20 from the supply source 25. The liquid is supplied to the distributor line 76 of the applicator 70 through the supply line 60 carried by the boom (35, and the applicator 75 dispenses the liquid nutrients into the ground between the crop rows R. As the hose 20 is pulled from the reel 15, the reel brake 38 (FIG. 7) may be applied to prevent overrunning. The reel 15 can move in an axial direction by movement of the carriage 30 or by driving the vehicle wheels 39 or by movement of the tractor 38. The hose 20 may also be directed by guide rollers supported at the side of the trailer or vehicle, as mentioned above, in order to maintain the hose 20 between two adjacent crop rows R as the hose is unwinding. After one course of drag hose is removed from the reel 15 as the tractor 75 moves down the field, the reel 15 either moves axially in an opposite direction for removing another course of the drag hose or the hose guide rollers at the side of the reel direct the hose between the two rows of crops.

Figure 9:
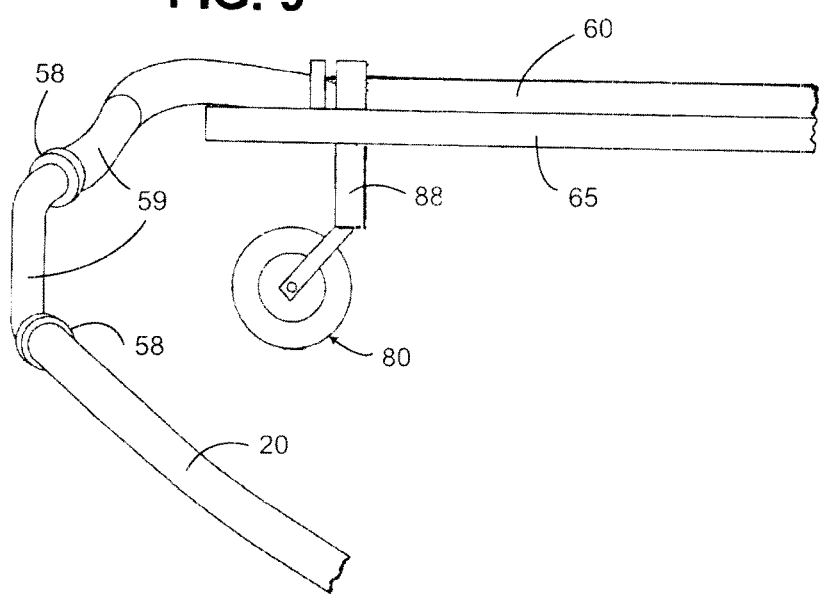
FIG. 9 is a perspective view of rearward end portions of the boom and supply line connected by flexible hoses to the outlet end of the drag hose.

When the tractor 75 and applicator 70 reach the distal or opposite end of the field F, as shown in the upper portion of FIG. 1, the applicator 70 and the forward end portions of the boom 65 and supply line 60 are elevated by the tractor 75. The rearward end portion of the boom 65 and the supported supply line 60 may remain elevated as shown in FIG. 4 or may be elevated by pivoting the caster wheel 80 as shown in FIG. 2. The tractor 75 then makes a U-turn causing the elevated boom 65 and supply line 60 to pass over an outer end portion of the elevated applicator 70. The boom 65 pivots on the coupling 68 until the boom 65 projects laterally from the tractor 75 and applicator 70, as shown in FIG. 1, causing the flexible hose 59 and couplings 58 to bend as shown in FIG. 9 so that the drag hose 20 remains between the two adjacent crop rows R where the drag hose was pulled the entire length of the field. While the applicator 70 is illustrated to dispense and apply liquid nutrients between twelve crop rows R, the applicator 70 is preferably constructed to dispense and apply the liquid between more than twelve crop rows, for example between at least sixteen crop rows.

After the tractor 75 and attached applicator 70 complete the U-turn in the parallel end rows of the crop rows which usually extend perpendicular to the crop rows R, the tractor 75 and applicator 70 are positioned to apply liquid to another plurality or group of crop rows R, as shown in the upper portion of FIG. 1. As the tractor 75 and lowered applicator 70 return to the first end of the field, the liquid is continuously supplied to the applicator 70 through the drag hose 20 and supply line 60. As the tractor 75 and applicator 70 return to the first end of the field, the drag hose 20 is retracted by the hose reel 15 at the same rate of movement of the tractor 75 while the elevated supply line 60 and boom 65 continue to project laterally from the tractor and pass over the tops of the growing crops in the crop rows R. The end portion 66 of the boom 65 remains elevated by the cylinder 62 and caster wheel 80 during the turn and return so that only a minimum of the growing crops in the end crop rows are damaged. While the drag hose 20 is being retracted on the power driven reel 15, the reel either shifts back and forth axially by movement of the carriage 30 or by movement of the vehicle 35 or is directed by the side guide rollers so that the drag hose always remains between the two adjacent crop rows R during the return of the tractor 75 and applicator 70.

After the tractor 75 and applicator 70 arrive at the end portion of the field where the vehicle 35 and tractor 38 are located, the drag hose 20 is fully retracted on the reel 15. The vehicle 35 then moves forwardly to position the retracted drag hose 20 to the next plurality or group of crop rows R, and the tractor 75 and applicator 70 make another U-turn behind the vehicle 35. The above cycle is repeated until the entire field has received the liquid nutrients or liquid manure between the crop rows R. The movement and operation of the vehicle 35 and the rotation of the reel 15 may be controlled from the tractor 75 by use of a global positioning system such as a GPS Guided Tractor System. During the entire movement of the tractor 75 and applicator 70 back and forth along the length of the field, liquid is preferably supplied continuously to the applicator. If it is necessary to stop the flow of liquid to the applicator 70 momentarily while the tractor 75 makes a U-turn at the opposite ends of the field, a small liquid cumulator tank may be carried by the tractor 75 or by the vehicle 35 and be connected to the drag hose supply line 22 or to the applicator supply line 60 on the boom 65.

It is apparent from the drawings and the above description, that the system or method and apparatus for applying liquid nutrients between parallel rows of standing crops growing in a field provides a number of advantages. For example, by keeping the drag hose 20 on the reel 15 filled with liquid, which is the heaviest component of the system, at one end of the field and only pulling the drag hose 20 with the boom 65 through the field with the tractor 75 and attached applicator 70, a long drag hose may be used, and the compaction of the soil is minimized In addition, the growing crops receive substantially all of the nutrients within the liquid at a time when the nutrients provide the greatest benefit to the crops. Also, by applying the liquid nutrients while the crops are growing and after heavy spring rains have passed, the chance of the nutrients leaching into streams adjacent the field F is greatly reduced because the nutrients move through the soil into the growing crops when the crops are best able to absorb and utilize the nutrients. The system for applying the liquid nutrients in accordance with the invention also results in minimizing damage to the standing crops, including minimal damage in the perpendicular end rows of crops.

While the method and form of apparatus herein described constitute a preferred embodiment of the invention, it is to be understood that the invention is not limited to precise method and form of apparatus described, and that changes made therein without departing from the scope and spirit of the invention as defined in the appended claims.

What is claimed is:

1. A method of efficiently applying liquid nutrients to parallel rows of standing crops growing in a field with minimal damage to the crops, the method comprising the steps of
winding an elongated flexible drag hose onto a power driven hose reel with the drag hose having an inlet and an outlet,
supporting the hose reel with a vehicle for axial movement of the hose reel adjacent a first end of the field and perpendicular to the rows of crops,
connecting the drag hose extending from the hose reel to an elongated substantially rigid boom having an end portion connected to a central portion of an elongated applicator connected to a tractor positioned to move between the rows of standing crops,
pulling the drag hose longitudinally directly from the hose reel with the tractor and between two of the parallel rows of crops and in alignment with the center of the tractor,
pivotally connecting the boom to the applicator with the applicator extending laterally substantially beyond opposite sides of the tractor,
connecting the drag hose to a liquid distribution line of the applicator with the distribution line having outlets located between the rows of crops,
pumping the liquid nutrients from a supply source into the inlet of the drag hose supported by the hose reel,
pulling the drag hose with the tractor directly from the hose reel between the two rows of crops with the hose reel rotating on its axis while the applicator and distribution line supply the liquid nutrients to a first group of at least six of the parallel rows of standing crops,
maintaining the drag hose between the two rows of crops while pulling the drag hose from the reel with the tractor,
turning the tractor and applicator at an opposite second end of the field while the boom and the applicator are elevated above the crops and with the boom pivoting to a continuous supply position projecting outwardly and longitudinally from an end portion of the applicator about one half the length of the applicator and to position the tractor with the applicator extending transversely to a second group of at least six of the parallel rows of crops,
returning the tractor and the applicator to the first end of the field with the boom in the continuous supply position for continuously supplying the liquid nutrients through the drag hose and distribution line to the second group of rows of crops,
maintaining the drag hose between the two rows of crops with the boom and applicator extending transversely from the tractor and with the boom in the continuous supply position projecting from the end portion of the applicator above the crops while rewinding the drag hose directly onto the hose reel,
synchronizing the rewinding of the drag hose onto the hose reel with the returning of the tractor and applicator,
moving the hose reel axially with the vehicle to a third group of at least six rows of crops, and
repeating the above steps to apply the liquid nutrients to the third group of the parallel rows of crops.

2. A method as defined in claim 1 and including the step of supporting the boom with a wheel and for elevating the boom while turning the tractor and applicator at the opposite second end of the field.

3. A method as defined in claim 1 and including the step of supporting the hose reel for axial movement on the vehicle during the pulling of the drag hose with the tractor from the hose reel and during rewinding of the drag hose on the hose reel.

4. A method as defined in claim 1 wherein each group of parallel rows of standing crops comprises at least sixteen rows of standing crops.

5. A method as defined in claim 1 including the step of forming the drag hose with an inner diameter of over four inches and length over two thousand feet.

6. A method of efficiently applying liquid nutrients to parallel rows of standing crops growing in a field with minimal damage to the crops, the method comprising the steps of
winding an elongated flexible drag hose onto a power driven hose reel with the drag hose having an inlet and an outlet,
supporting the hose reel with a vehicle for axial movement of the hose reel adjacent a first end of the field and perpendicular to the rows of crops,
connecting the drag hose extending from the hose reel to an elongated substantially rigid boom having an end portion connected to a central portion of an elongated applicator connected to a tractor positioned to move between the rows of standing crops and with the drag hose positioned to slide longitudinally between two adjacent rows of crops in alignment with the center of the tractor,
pivotally connecting the boom to the applicator with the applicator extending laterally substantially beyond opposite sides of the tractor,
connecting the drag hose to a liquid distribution line of the applicator with the distribution line having outlets located between the rows of crops,
pumping the liquid nutrients from a supply source into the inlet of the drag hose supported by the hose reel,
pulling the drag hose with the tractor directly from the hose reel between the two adjacent rows of crops with the hose reel rotating on its axis while the applicator and distribution line supply the liquid nutrients to a first group of at least six parallel rows of standing crops,
maintaining the drag hose between the two adjacent rows of crops while pulling the drag hose from the reel with the tractor,
turning the tractor and applicator at an opposite second end of the field while elevating the boom and the applicator above the crops to position the tractor with the applicator extending transversely to a second group of at least six parallel rows of crops,
supporting the boom with a wheel supported by a frame and for elevating the boom by actuating a hydraulic cylinder connected to the frame while turning the tractor and applicator at the opposite second end of the field,
returning the tractor and the applicator to the first end of the field while continuously supplying the liquid nutrients through the drag hose and distribution line to the second group of rows of crops,
maintaining the drag hose between the two rows of crops with the boom and applicator extending transversely from the tractor above the crops while rewinding the drag hose directly onto the hose reel,
synchronizing the rewinding of the drag hose onto the hose reel with the returning of the tractor and applicator,
moving the hose reel axially with the vehicle to a third group of at least six rows of crops, and repeating the above steps to apply the liquid nutrients to the third group of rows of crops.

7. A method of efficiently applying liquid nutrients to parallel rows of standing crops growing in a field with minimal damage to the crops, the method comprising the steps of
  winding an elongated flexible drag hose onto a power driven hose reel with the drag hose having an inlet and an outlet,
  supporting the hose reel with a vehicle for axial movement of the hose reel adjacent a first end of the field and perpendicular to the rows of crops,
  connecting the drag hose extending from the hose reel to an elongated substantially rigid boom having an end portion connected to a central portion of an elongated applicator connected to a tractor positioned to move between the rows of standing crops and with the drag hose positioned to slide longitudinally between two adjacent rows of crops in alignment with the center of the tractor,
  pivotally connecting the boom to the applicator with the applicator extending laterally substantially beyond opposite sides of the tractor,
  connecting the drag hose to a liquid distribution line of the applicator with the distribution line having outlets located between the rows of crops,
  pumping the liquid nutrients from a supply source into the inlet of the drag hose supported by the hose reel,
  pulling the drag hose with the tractor directly from the hose reel between the two adjacent rows of crops with the hose reel rotating on its axis while the applicator and distribution line supply the liquid nutrients to a first group of at least six parallel rows of standing crops,
  maintaining the drag hose between the two adjacent rows of crops while pulling the drag hose from the reel with the tractor,
  turning the tractor and applicator at an opposite second end of the field while elevating the boom and the applicator above the crops to position the tractor with the applicator extending transversely to a second group of at least six parallel rows of crops,
  supporting the boom with a wheel mounted on a frame rotatable on a vertical axis with a power actuator while turning the tractor and applicator to align the wheel between the two adjacent rows of standing crops,
  returning the tractor and the applicator to the first end of the field while continuously supplying the liquid nutrients through the drag hose and distribution line to the second group of rows of crops,
  maintaining the drag hose between the two rows of crops with the boom and applicator extending transversely from the tractor above the crops while rewinding the drag hose directly onto the hose reel,
  synchronizing the rewinding of the drag hose onto the hose reel with the returning of the tractor and applicator,
  moving the hose reel axially with the vehicle to a third group of at least six rows of crops, and
  repeating the above steps to apply the liquid nutrients to the third group of rows of crops.

* * * * *